(12) United States Patent
Hermann et al.

(10) Patent No.: US 12,213,407 B2
(45) Date of Patent: Feb. 4, 2025

(54) GRAIN CLEANING SYSTEM AND METHOD OF CONTROLLING SUCH

(71) Applicant: AGCO International GmbH, Neuhausen (CH)

(72) Inventors: Dan Hermann, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 845 days.

(21) Appl. No.: 17/417,101

(22) PCT Filed: Nov. 22, 2019

(86) PCT No.: PCT/EP2019/082251
§ 371 (c)(1),
(2) Date: Jun. 21, 2021

(87) PCT Pub. No.: WO2020/126309
PCT Pub. Date: Jun. 25, 2020

(65) Prior Publication Data
US 2022/0046857 A1 Feb. 17, 2022

(30) Foreign Application Priority Data
Dec. 19, 2018 (GB) ..................... 1820714

(51) Int. Cl.
*A01D 41/127* (2006.01)
*A01F 12/44* (2006.01)
*G01P 5/24* (2006.01)

(52) U.S. Cl.
CPC ..... *A01D 41/1276* (2013.01); *A01D 41/1272* (2013.01); *A01F 12/444* (2013.01); *A01F 12/448* (2013.01); *G01P 5/242* (2013.01)

(58) Field of Classification Search
CPC ............ A01D 41/1272; A01D 41/1276; A01D 41/444; A01D 41/448; A01F 7/06;
(Continued)

(56) References Cited

U.S. PATENT DOCUMENTS 8,469,784 B1 * 6/2013 Hoskinson ........... A01D 41/127
460/4
10,194,585 B2 * 2/2019 Aesaert ................ A01F 12/448
(Continued)

FOREIGN PATENT DOCUMENTS

DE  10 2013 214984 A1   2/2015
EP     2 977 735 A2     1/2016
(Continued)

OTHER PUBLICATIONS

European Patent Office, International Search Report for related International Application No. PCT/EP2019/082251, mail date Feb. 28, 2020.

*Primary Examiner* — Thomas B Will
*Assistant Examiner* — Robert E Pezzuto

(57) ABSTRACT

An impact sensor is mounted in a duct of a grain cleaning system above an upper sieve. The impact sensor has an upstream-facing impact-sensing surface with respect to a cleaning airstream, and is configured to transduce impact events and generate impact signals. An electronic control unit (ECU) is configured to generate control signals based upon a particle energy value that is determined from the impact signals. The control signals may serve to adjust various working units of a combine harvester including, by way of example, a cleaning fan and sieves.

15 Claims, 8 Drawing Sheets

(58) Field of Classification Search
CPC .......... A01F 12/28; A01F 12/48; A01F 12/52; A01F 12/181; A01F 12/444; A01F 12/448; G01F 1/66; G01P 5/241; G01P 5/248

See application file for complete search history.

(56) References Cited

U.S. PATENT DOCUMENTS

| | | | |
|---|---|---|---|
| 2006/0229119 A1* | 10/2006 | Wamhof | A01D 75/282 460/101 |
| 2017/0202143 A1* | 7/2017 | Garton | A01D 46/085 |
| 2020/0077583 A1* | 3/2020 | Vandike | G06N 20/00 |

FOREIGN PATENT DOCUMENTS

| | | |
|---|---|---|
| EP | 3 095 313 A1 | 11/2016 |
| EP | 3 238 527 A1 | 2/2017 |
| WO | 2016/058890 A1 | 4/2016 |

\* cited by examiner

GRAIN CLEANING SYSTEM AND METHOD OF CONTROLLING SUCH

FIELD OF THE INVENTION

The invention relates to grain cleaning systems and particularly, but not exclusively, to grain cleaning systems provided in combine harvesters for the screening of clean grain from material other than grain in a harvested crop material stream. The invention also relates to a method of controlling a combine harvester having a grain cleaning system.

BACKGROUND OF THE INVENTION

The process of harvesting grain from crop fields has not changed substantially for many decades. Farmers use combine harvesters to cut a standing crop, thresh the crop material, separate the grain from the stem and clean the grain whilst returning the crop material residue onto the field. Typically, combine harvesters include threshing apparatus, separating apparatus and a grain cleaning system.

Grain cleaning systems utilise screening apparatus which typically includes one or more sieves driven in an oscillating motion. A mixture of grain, chaff, unthreshed heads and straw is delivered to an uppermost sieve upon which the mixture is conveyed across the surface thereof. Hereinafter the chaff and straw will be referred to as 'MOG', Material Other than Grain.

Generally speaking, clean grain finds its way down through the sieves to a collection trough. A fan is provided to generate a cleaning airstream through the cleaning apparatus. The cleaning airstream is directed through and/or over the sieves so as to lift and carry the MOG away from the surface of the sieves and eject it from the cleaning system. The sieves are generally set up to screen the unthreshed heads which are 'returned' as tailings to a rethreshing system.

Today it is known to provide combines with control systems that automatically adjust settings of the various crop processing apparatus such as the fan speed, sieve opening, and ground speed. Such "auto-setting" functionality relieves the operator of making manual adjustments to optimise the harvesting process, wherein the optimum settings continuously change as harvest conditions vary. However, for reliable auto-setting operation an accurate representation of the current conditions within the various processing apparatus is required.

SUMMARY OF THE INVENTION

According to a first aspect of the invention there is provided a grain cleaning system comprising screening apparatus having a duct, an upper sieve and a lower sieve disposed in the duct, a fan arranged to generate a cleaning airstream through the duct, an impact sensor mounted in the duct above the upper sieve and having an upstream-facing impact-sensing surface with respect to the cleaning airstream, the impact sensor being configured to transduce impact events and generate impact signals therefrom, an electronic control unit (ECU) that is in communication with the impact sensor, the ECU being configured to generate control signals based upon a particle energy value that is determined from the impact signals.

According to a second aspect of the invention there is provided a method of controlling a combine harvester which comprises a plurality of working units including a grain cleaning system having an upper sieve and a lower sieve, the method comprising positioning an impact sensor above the upper sieve, the impact sensor having an upstream-facing impact-sensing surface, generating an impact signal, and calculating a particle energy value from the impact signal.

The inventions exploits the physical relationship between kinetic energy, mass and velocity of the airborne material in the cleaning airstream to generate control signals. The MOG throughput or load of the grain cleaning system is recognised as an important parameter required for optimal adjustment of the crop processing apparatus, most notably the fan speed, upper sieve opening and lower sieve opening. The invention involves the recognition that the kinetic energy of the airborne MOG is proportional to the MOG load.

The control signals may also be based upon a fan speed value to give an indication of the MOG or particle velocity. The duct may comprise a pair of sidewalls between which the upper sieve and lower sieve are located, and a ceiling, wherein the impact sensor is mounted closer to the ceiling than to the upper sieve. There is a recognition that the airborne MOG is generally predominantly present in the upper portion of the duct.

In one embodiment the upper sieve and lower sieve are coupled to an oscillating drive mechanism, wherein the fan is located at an upstream end of the sieve, and wherein the cleaning airstream is directed through and/or over the sieve. The sieves may comprise a plurality or adjustable louvres that set the screening coarseness as is common in the art.

In a preferred embodiment the grain cleaning system further comprises an ultrasonic sensing device having a transmitter configured to transmit a base signal through the cleaning airstream, and a receiver configured to transduce a reflected signal that is reflected off of airborne particles in the cleaning airstream, wherein the ECU is in communication with the ultrasonic sensing device, wherein the ECU is configured to determine a Doppler frequency from a base signal frequency and a reflected signal frequency, and to determine a particle velocity value from the Doppler frequency. This embodiment exploits the Doppler effect to determine a particle velocity value for the particles moving in the cleaning airstream. The base signal is reflected off of moving particles in the duct which primarily consist of a proportional mix of grain and MOG that is either airborne or carried on the sieve. The reflected signal is detected by the receiver and one or more Doppler frequencies are determined from the frequency of the base signal and the frequency of the reflected signal.

Advantageously, by obtaining a particle velocity value a more accurate estimation of MOG throughput can be achieved using the physical relationship between kinetic (or impact) energy, velocity and mass. As such the ECU may be configured to determine a particle mass value from the particle energy value and the particle velocity value.

The grain cleaning system may comprise an operator console which is in communication with the ECU, wherein the operator console displays a material load which is proportional to the particle mass value.

The ECU may be further configured to generate an airstream velocity value based upon a phase shift parameter calculated from signals received by the ultrasonic sensing device, and to generate control signals for the control of one of the fan, a sieve opening and upstream processing systems based upon the airstream velocity value. The speed or velocity of the airstream itself is thus determined using measurement of phase shift between a transmitted acoustic signal and a portion of the transmitted signal that is modified by the airstream. From a phase shift parameter an airstream velocity value can be calculated and used as an algorithm input for the control of the working units.

The control signals may function to control the fan speed. In one example, a fan control algorithm executed by the ECU may output fan adjustment signals wherein a positive fan adjustment signal (increase fan speed) results from an particle energy value being below a first threshold velocity value, and wherein a negative fan adjustment signal (reduce fan speed) results from the particle energy value being above a second threshold.

The grain cleaning system is preferably embodied in a combine harvester. However, it is envisaged that aspects of the invention may be embodied in alternative machines including stationary grain cleaning systems.

A combine harvester embodying an aspect of the invention preferably further comprises threshing apparatus and separating apparatus located upstream to the grain cleaning system with respect to a crop material flow.

Although control of the fan speed or sieve opening by control signals delivers significant advantages as described above, it is envisaged that the control signals may in addition, or instead, serve to control one of a concave adjustment and a rotor speed.

BRIEF DESCRIPTION OF THE DRAWINGS

Further advantages of the invention will become apparent from reading the following description of specific embodiments with reference to the appended drawings in which.

DETAILED DESCRIPTION OF SPECIFIC EMBODIMENTS OF THE INVENTION

Aspects of the invention will now be described in connection with various preferred embodiments implemented on a combine harvester. Relative terms such as front, rear, forward, rearward, left, right, longitudinal and transverse will be made with reference to the longitudinal vehicle axis of the combine harvester travelling in the normal direction of travel. The terms "direction of conveyance", "upstream" and "downstream" are made with reference to the general flow of crop material through the combine harvester, or to the cleaning airstream through the screening apparatus.

Although the embodiments described relate to a grain cleaning system in a combine harvester, it should be appreciated that aspects of the invention can be embodied in other grain cleaning systems such as stationary systems that may, for example, be located at a grain processing plant.

Figure 1:
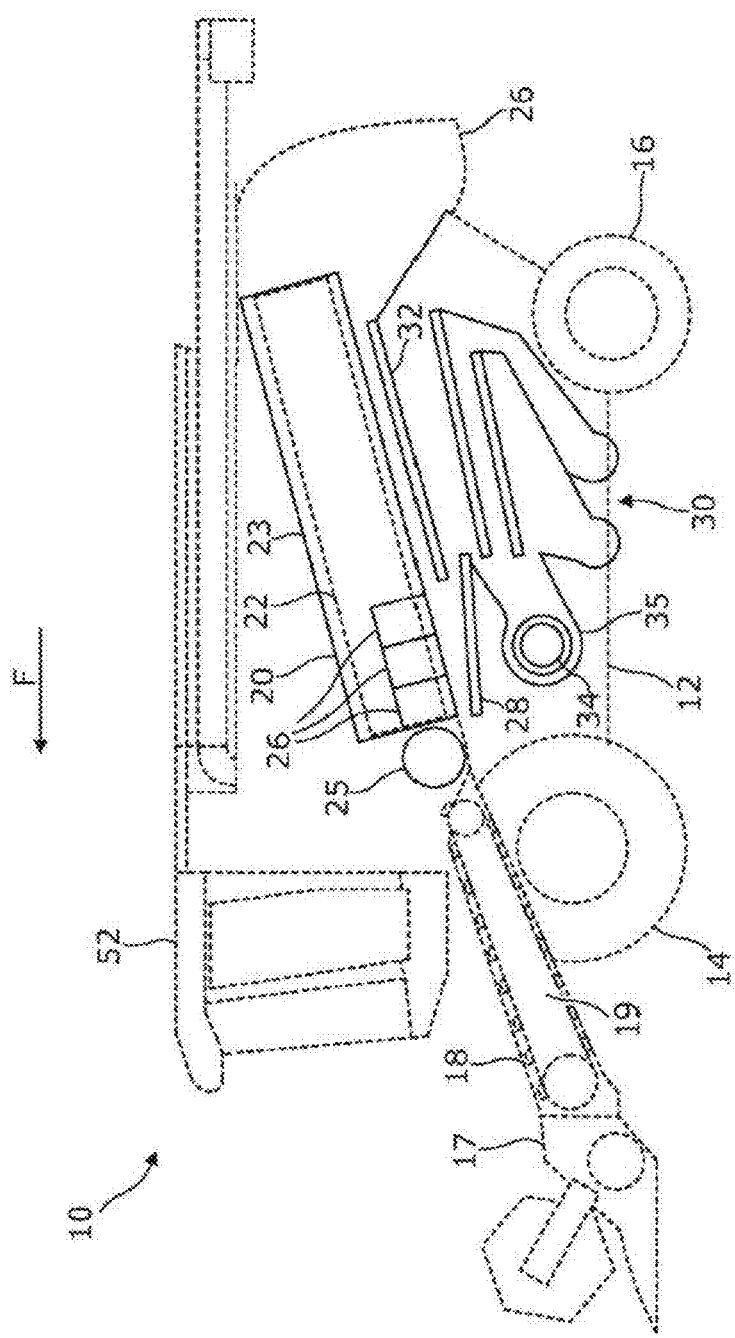
FIG. 1 is a schematic side elevation of a combine harvester in accordance with a first embodiment of the invention, shown with the side panels removed to reveal the inside processing systems.

With reference to FIG. 1 a combine harvester 10 includes a frame or chassis 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvester other harvesting crops.

The cut crop stream is conveyed rearwardly from the feederhouse 18 to a processor designated generally at 20. In the illustrated embodiment the processor 20 is of the axial rotary type having a pair of axial-flow threshing and separating rotors 22 which are each housed side-by-side inside a respective rotor housing 23 and are fed at their front end by a feed beater 25. It should be appreciated that the right-hand rotor is hidden from view in FIG. 1. The rotors serve to thresh the crop stream in a front 'threshing' region, separate the grain therefrom in a rear 'separating' region, and eject the straw residue through the rear of the machine 26 either directly onto the ground in a windrow or via a straw chopper (not shown).

Each rotor housing 23 is generally cylindrical and is made up of an opaque upper section and a foraminous lower section which includes a set of side-by-side arcuate concave grate segments 26 extending the length of the front threshing region and which allow the threshed material to fall by gravity onto a grain collection pan 28 located below for onward conveyance to a grain cleaning system which is designated generally at 30. Guide vanes (not shown) are secured to the inside of the rotor housing and serve, in conjunction with the crop engaging elements on the rotor 22, to convey the stream of crop material in a generally rearward spiral path from front to rear.

The separating region at the rear portion of rotors 22 comprises plural crop engaging elements (not shown) to separate the residual grain from the stream of crop material. A grain return pan 32 is provided underneath the separating region to collect the separated grain and convey it forwardly for delivery onto the grain collection pan 28. Both the collection pan 28 and return pan 32 are driven so as to oscillate in a known manner.

Although described as a rotary axial type, the processor 20 may be of an alternative type such as known conventional, hybrid or transverse types without departing from the scope of the invention. For example, in the case of a conventional type processor, a transverse cylindrical beater may be provided as threshing apparatus and a set of strawwalkers provided as separating apparatus.

Figure 2:
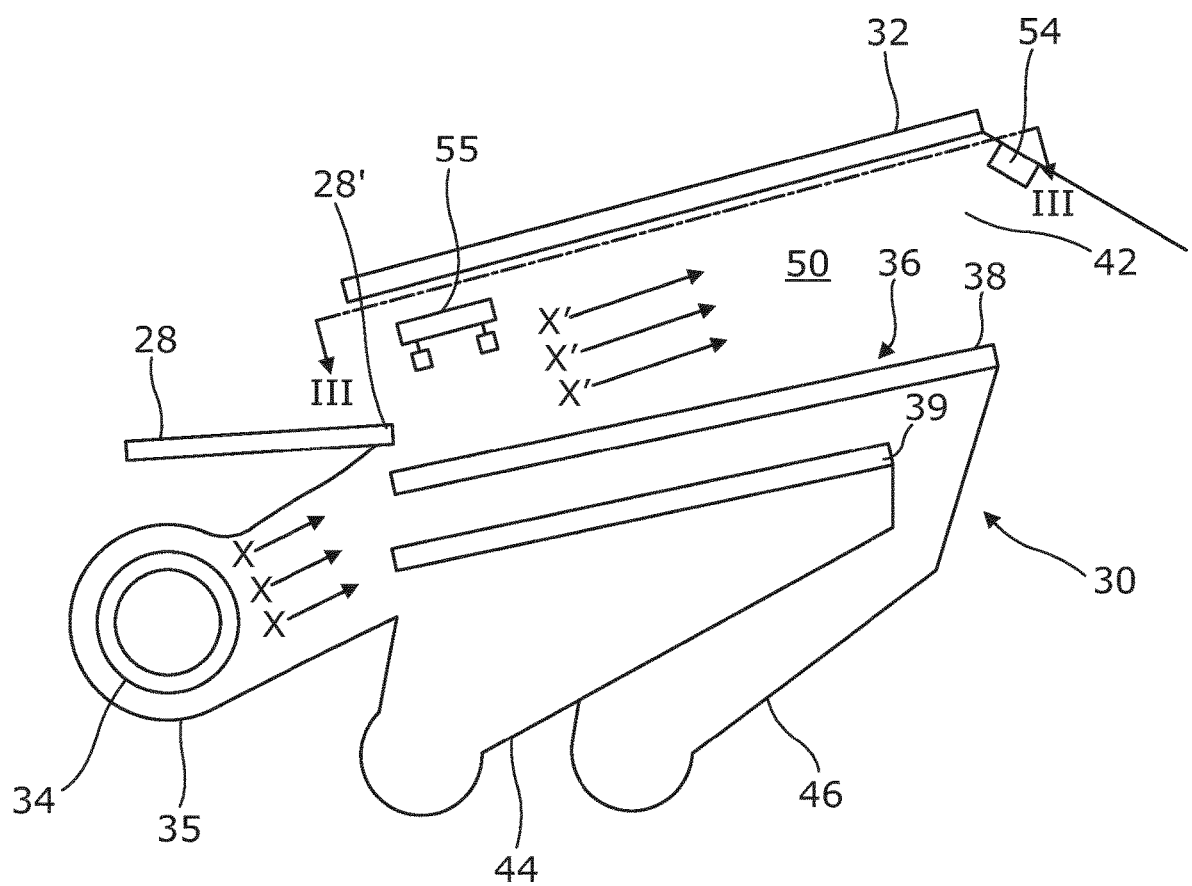
FIG. 2 is a schematic side view of the grain cleaning system in the combine harvester of FIG. 1.
Figure 3:
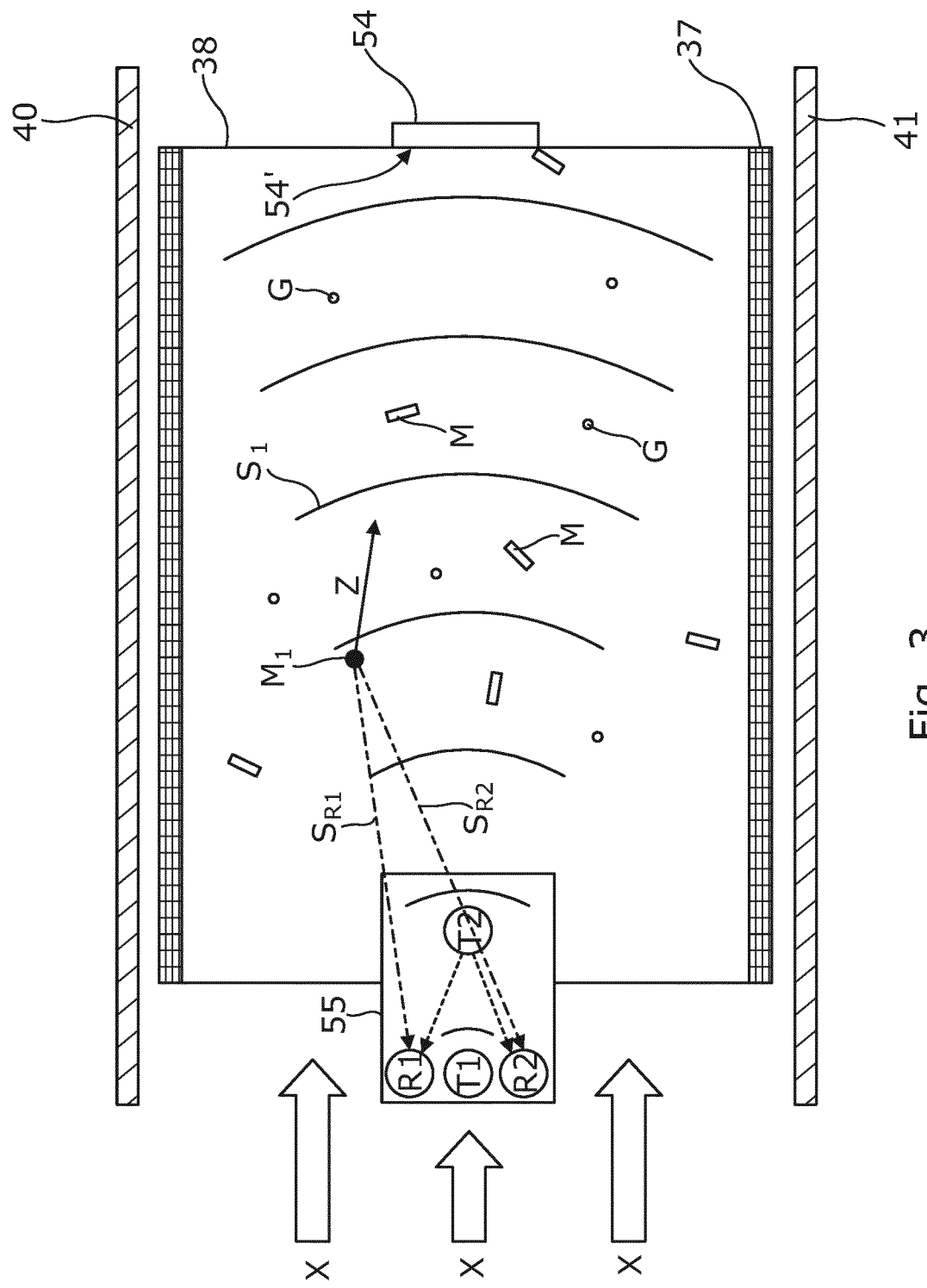
FIG. 3 is a top-down view of the grain cleaning system of FIG. 2 viewed along the line III-III.

With reference to FIGS. 1-3 the grain cleaning system 30 comprises a fan 34 housed in a fan housing 35. The fan 34 may be of a known type such as a crossflow or centrifugal fan that rotates on a transverse axis and draws in air either tangentially or axially through air intake openings. A cleaning airstream generated by the fan 34 and exhausted from the fan housing 35 is represented in FIG. 3 by arrows 'X'.

The fan 34 is driven by a fan drive system (not shown) which may derive its power via a mechanical drive coupled to the processor 20. Alternatively, the fan 34 may be driven by a hydraulic or electric motor. In any case, the fan drive system is operable to drive the fan 34 with an adjustable speed determined by a fan speed controller 134 (FIG. 4) that is in communication with the fan drive system.

The grain cleaning system further comprises screening apparatus 36 which includes a shoe frame 37, upper sieve 38 (alternatively referenced 'chaffer') and a lower sieve 39. The sieves 38, 39 are driven with an oscillating motion in a known manner. The sieves 38, 39 are mounted between side members of the shoe frame 37 which is suspended on hangers (not shown) from the frame 12 and driven in an oscillating motion.

The sieves 38, 39 each comprise a plurality of transverse louvres which can be adjusted either manually or remotely to adjust the coarseness of the screen provided. The louvres are arranged in a parallel transverse relationship and pivot to adjust the opening or gap between adjacent ones.

The combine 10 comprises a pair of vertical sidewalls 40, 41 (FIG. 3) between which the shoe frame 37 and sieves 38, 39 are located. The sidewalls 40, 41 typically form part of the frame 12.

The threshed material comprising a mixture of grain and MOG is conveyed by the grain collection pan 28 in a rearward direction until it falls from a rear edge 28' and into the grain cleaning system 30. The cleaning airstream is directed through and over the sieves 38, 39 in a known manner so as to lift the lighter material, primarily MOG, away from the surface of upper sieve 38 and in a rearward direction for ejection at a rear outlet 42.

In a known manner, the screening apparatus 36 is operable to allow the clean grain to pass through the sieves 38, 39, wherein the clean grain is collected in a transverse clean grain trough 44 and conveyed onwards to an on-board grain tank (not shown). The louvres of upper sieve 38 may be set to allow unthreshed heads to pass through a rear region of the upper sieve 38 into a tailings collection trough 46. Likewise, any material screened out by lower sieve 39 falls from the rear edge thereof into the tailings collection trough 46 from where the 'returns' are fed back to the processor 20 or a dedicated rethreshing system (not shown).

A duct 50 is bounded by the sidewalls 40, 41, the return pan 32, the clean grain trough 44 and tailings collection trough 46. The duct 50 serves as a channel for the cleaning airstream which is generated at a front end by the fan 34 and exits at the rear outlet 42. The sieves 38, 39 are located in the duct 50.

Figure 4:
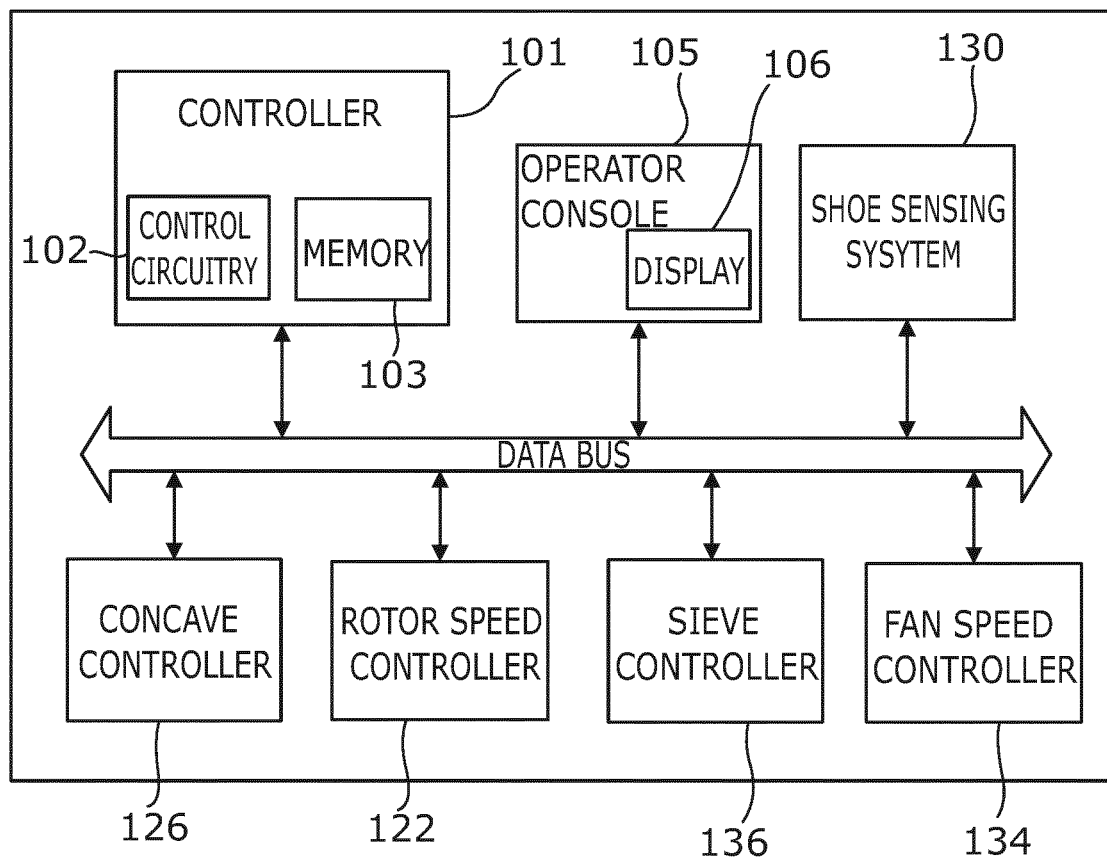
FIG. 4 is a block diagram of the grain cleaning system embodied in the combine harvester of FIG. 1.

With reference to FIG. 4, an electronic control unit (hereinafter termed 'ECU') 101 is provided and is in communication (via a databus) with an operator console 105, a shoe sensing system 130, a concave controller 126, a rotor speed controller 122, a sieve controller 136, and the fan speed controller 134. The ECU 101 comprise control circuitry 102 which may be embodied as custom made or commercially available processor, a central processing unit or an auxiliary processor among several processors, a semiconductor based micro-processor (in the form of a microchip), a macro processor, one or more applications specific integrated circuits, a plurality of suitably configured digital logic gates, and/or other well-known electrical configurations comprising discrete elements both individually and in various combinations to coordinate the overall operation of the combine 10.

The ECU 101 further comprises memory 103. The memory 103 may include any one of a combination of volatile memory elements and non-volatile memory elements. The memory 103 may store a native operating system, one or more native applications, emulation systems, emulated applications for any of a variety of operating systems and/or emulated hardware platforms, emulated operating systems etc. The memory 103 may be separate from the controller 101 or may be omitted.

The operator console 105 comprises a display 106 which may be integrated as part of a terminal having user interface devices such as buttons, levers and switches. The console 105 is mounted proximate to a drivers work station in the cab 52.

The concave controller 126, rotor speed controller 122, sieve controller 136, and fan speed controller 134 each serve to control adjustments of respective working units of the combine 10 and may each comprise a local standalone processor and/or memory, or may be integrated into the central ECU 101. Control signals generated by the ECU 101 are communicated to the respective working unit controllers 126, 122, 136, 134 which are then translated into an adjustment of the associated working unit including the concave 26, processing rotor 22, sieves 38, 39 and fan 34.

Figure 5:
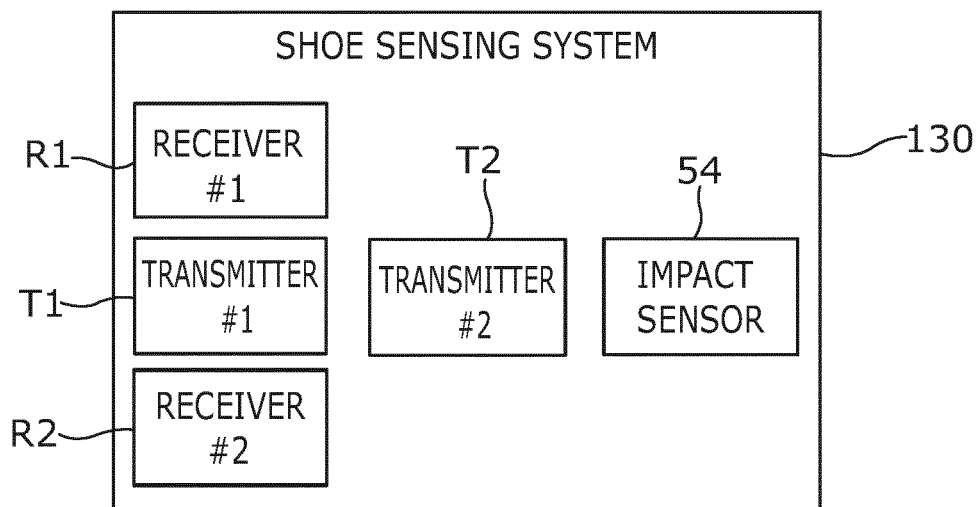
FIG. 5 is a block diagram showing more detail of the shoe sensing system included in the system of FIG. 4.
Figure 12:
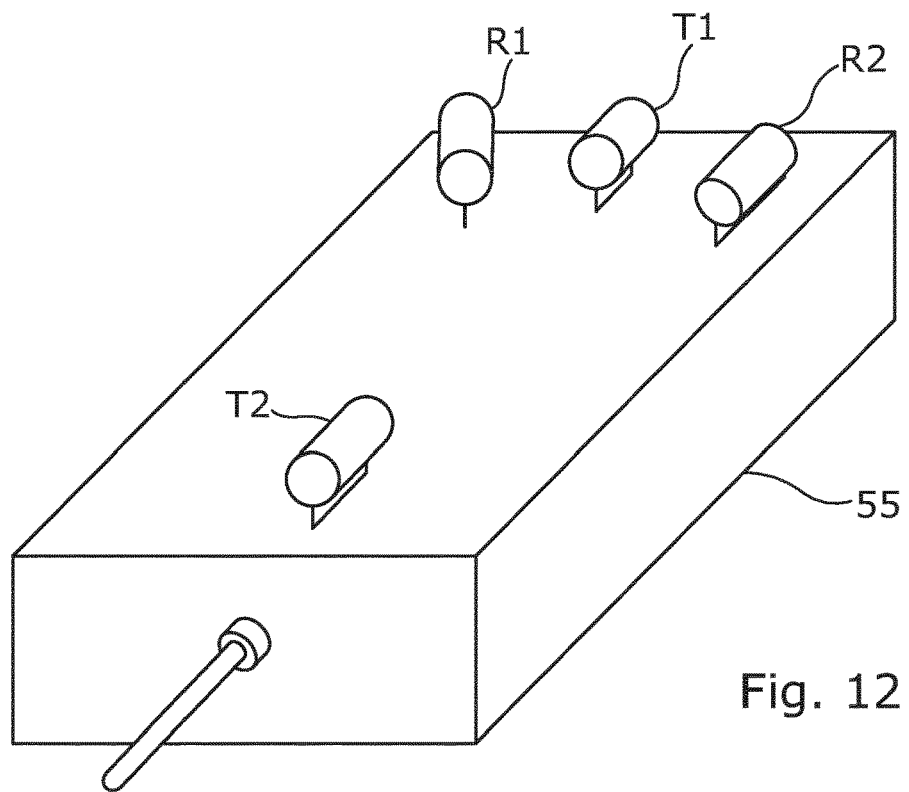
FIG. 12 is a perspective view of a sensing module which forms a part of the shoe sensing system of FIG. 5.

With particular reference to FIGS. 3, 5 and 12, the shoe sensing system 130 comprises a first and second ultrasonic transmitters T1, T2, first and second ultrasonic receivers R1, R2, and an impact sensor 54. The transmitters T1, T2 and receivers R1, R2 are mounted onto a common sensing module 55 which is mounted above a front region of the upper sieve 38.

The first transmitter T1 is located approximately midway between the sidewalls 40, 41 and faces in a generally rearward or downstream direction with respect to the cleaning airstream. The receivers R1, R2 are mounted in a transversely spaced relationship to respective sides of the first transmitter T1 on the sensing module 55. The receivers R1, R2 also face in a generally rearward or downstream direction with respect to the cleaning airstream so as to be protected from impact from the airborne MOG and grain carried by the airstream.

The second transmitter T2 is spaced rearwardly (or downstream) of the receivers R1, R2 on the module 55, and faces in a generally forward or upstream direction with respect to the cleaning airstream. In other words, the second transmitter T2 generally faces the receivers R1, R2.

It should be understood that the transmitters T1, T2 and the receivers R1, R2 may be mounted independently from one another without sharing a common module or mounting component. For example, in an alternative embodiment the receivers R1, R2 may be mounted to the sidewalls 40, 41 whilst the first transmitter T1 is mounted above the upper sieve 38. Digressing from the first embodiment, alternative embodiments having different arrangements for the transmitters and receivers are shown in FIGS. 9, 10 and 11.

Figure 9:
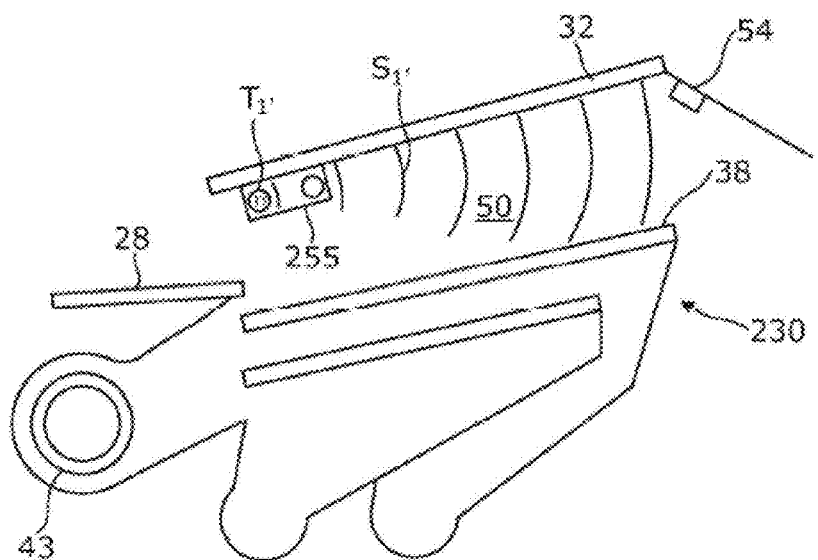
FIG. 9 is a schematic side view of the grain cleaning system in the combine harvester of FIG. 1 but in accordance with a third embodiment of the invention.

FIG. 9 shows a side view of a cleaning system 230 wherein a sensor module 255 is mounted to the underside of the return pan 32 in a front region of the duct. A transmitter T1' is mounted to the module 255 and is configured to transmit a first ultrasonic base signal $S_1$, in a generally downstream direction through the duct 50.

Figure 10:
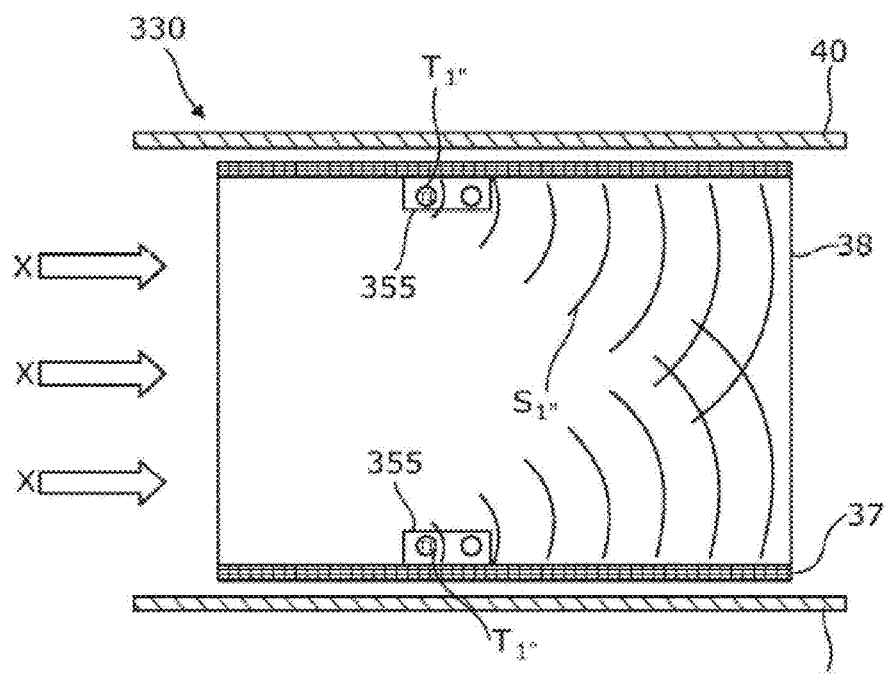
FIG. 10 is a top-down view of the grain cleaning system of FIG. 2 viewed along the line III-III but in accordance with a fourth embodiment of the invention.

FIG. 10 shows a top-down view of another cleaning system 330 wherein sensor modules 355 are mounted to the side frame members of the shoe frame 37. Again, the sensor modules 355 support at least a first ultrasonic transmitter T1" for transmitting a ultrasonic base signal $S_{1'''}$ in a generally downstream direction through the duct 50.

Figure 11:
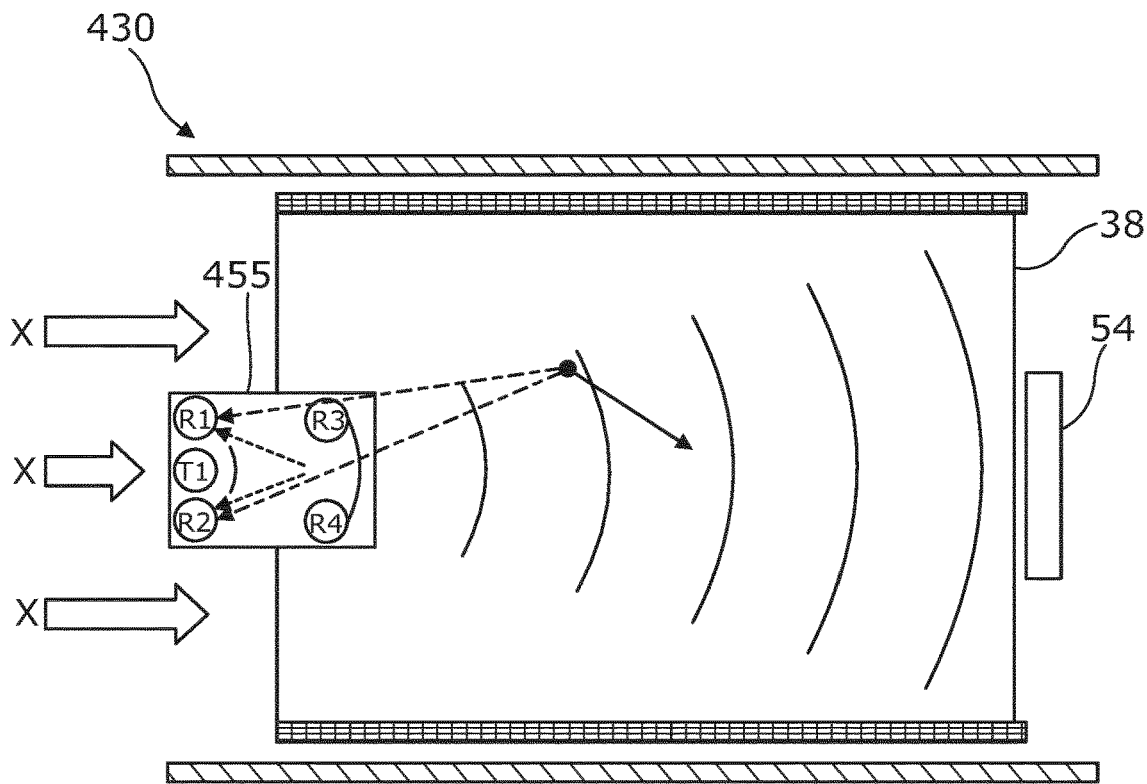
FIG. 11 is a top-down view of the grain cleaning system of FIG. 2 viewed along the line III-III but in accordance with a fifth embodiment of the invention.

FIG. 11 shows a top-down view of yet another cleaning system 430 wherein a sensing module 455 is mounted above the upper sieve 38 in a front region of the duct 50. In this example the second transmitter T2 of the first embodiment is omitted. Third and fourth ultrasonic receivers R3,R4 are mounted to the module and arranged to face in a generally upstream direction so as to face the output of the first transmitter T1 whilst being spaced therefrom. Third and fourth receivers R3,R4 serve to receive and transduce a modified signal in the phase shift mode of operation which will be described in more detail later on.

Turning back to the first embodiment shown in FIGS. 2 to 7, the impact sensor 54 is mounted in the duct 50 above the upper sieve 38 and has an impact-sensing surface 54' that faces upstream with respect to the cleaning airstream, that is in the direction of arrow F. The impact sensor 54 is located in an upper zone of the duct 50 spaced above the upper sieve 38, the upper zone extending upwards from midway between upper sieve 38 and the underside of the return pan 32.

In operation, the cleaning airstream velocity $v_a$ is ideally of a sufficient magnitude and direction to lift the MOG away from the upper sieve 38 whilst still allowing the grain-rich material to settle thereon. The fan speed $\omega_f$ significantly influences the airstream velocity $v_a$. However, the speed and direction of the cleaning airstream exhausted from the fan housing 35 (arrows X) is typically modified somewhat by the geometry of the screening apparatus 36 and by the crop material present in the airstream path. As such the cleaning airstream velocity $v_a$ flowing above the screening apparatus 36 (indicated by arrows X') differs substantially to that exhausted by fan 34 and varies as the state of the grain cleaning system changes during operation.

The invention involves the recognition that the airstream velocity $v_a$ above the screening apparatus provides a more accurate representation of the effectiveness of the grain cleaning system 30 at a given time. Moreover, the speed and direction of the MOG and any grain in the cleaning airstream represents the effectiveness of the cleaning airstream. Aspects of the invention exploit the physical properties of acoustic wave propagation in a moving medium and the Doppler effect to measure the state of the airborne grain and MOG within the duct 50 and of the cleaning airstream. Another aspect of the invention exploits the physical relationship between kinetic energy, mass and velocity to determine the mass of the airborne material flowing through the duct 50.

Values representing at least one of the airstream velocity $v_a$, the particle velocities $v_p$, and the particle mass $m_p$ are determined and used as an input in the generation of control signals to control the fan 34, the opening of the sieves 38, 39, and/or upstream processing systems such as the processor 20 and associated settings. For example, the speed of fan 34 may be adjusted to obtain the optimal air and particle velocity in order to reduce grain loss and MOG separation in the upper and lower sieves 38, 39.

The inventive aspects of the combine harvester 10 will be described in turn below. It should be appreciated that, although disclosed in a single embodiment in an integrated manner, the aspects may by implemented and operate independently of one another in alternative embodiments that are not described.

Doppler Mode

Figure 6:
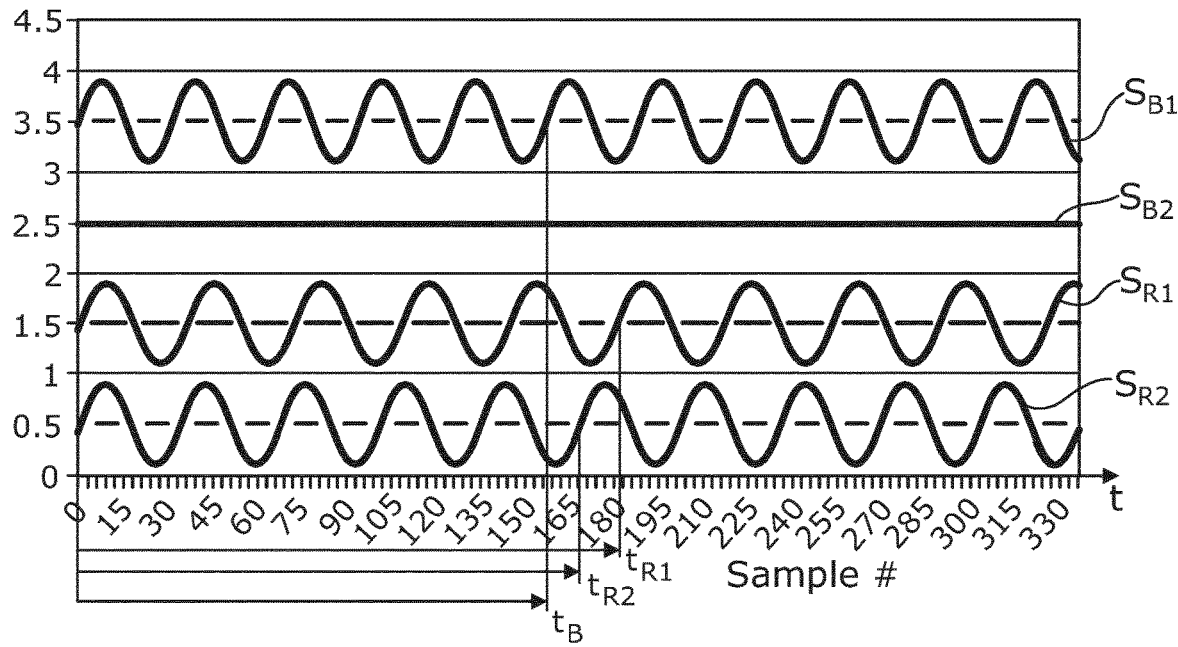
FIG. 6 is a plot of the base signals transmitted and the reflected signals received by the shoe sensing system shown in FIGS. 3 and 4 in a Doppler shift mode.

With reference to FIG. 3, first transmitter T1 is operable to transmit a first base signal $S_{B1}$ in the form of an ultrasonic wave having a frequency $f_{B1}$ through the space above the screening apparatus 36 in a generally rearward direction. The first base signal $S_{B1}$ is transmitted as a sine wave having a frequency of $f_{B1}$ which may to the order of 40 kHz for example. FIG. 6 shows a plot of first base signal $S_{B1}$.

In the Doppler mode of operation the second transmitter T2 (which is capable of transmitting a second base signal $S_{B2}$) is inactive or at least redundant.

Airborne MOG M and grain G is depicted in FIG. 3 and is representative of a mix of MOG and grain in a grain cleaning system in operation. Although the particles of MOG M and grain G move in a generally rearward direction, they may be caused to move at a tangent to a longitudinal path due to irregular airflow or blockages for example. Arrow z shows the direction of travel of MOG particle $M_1$.

Taken as a snapshot in time in one example FIG. 3 shows first receiver R1 receiving a first reflected signal $S_{R1}$ which is a portion of transmitted base wave $S_{B1}$ reflected off of MOG particle $M_1$. At the same instant second receiver R2 receives a second reflected signal $S_{R2}$ which is another portion of transmitted base wave $S_{B1}$ reflected off of MOG particle $M_1$. The reflected signals $S_{R1}$, $S_{R2}$ have a frequency $f_{R1}$, $f_{R2}$ respectively and are also plotted in FIG. 6.

The movement of the piece of MOG $M_1$ with respect to the receivers R1, R2 and with respect to the transmitter $T_1$ causes, due to the Doppler effect, a frequency shift between the first base signal $S_{B1}$ and the reflected signals $S_{R1}$, $S_{R2}$. The frequency shifts, hereinafter referred to as the Doppler frequencies $f_{D1}$, $f_{D2}$, are proportional to the particle velocity $v_{p1}$, $v_{p2}$ of the particle with respect to the two receivers R1, R2.

With reference to FIG. 6, the time taken for five complete cycles for each of the first base signal $S_{B1}$, and the two reflected signals $S_{R1}$, $S_{R2}$ is indicated as $t_{B1}$, $t_{R1}$, $t_{R2}$ respectively. It can be seen that the frequency $f_{R2}$ of the second reflected signal $S_{R2}$ is less than that of the base signal frequency $f_{B1}$. The frequency $f_{R1}$ of the first reflected signal $S_{R1}$ is less than that of the second reflected signal $f_{R2}$. Looking at the direction of MOG particle M1 (arrow z), the movement away from the receivers R1, R2 and the Doppler effect causes the observed (reflected) frequency to reduce with respect to the base frequency $f_B$.

The ECU 101 receives the transduced signals $S_{R1}$, $S_{R2}$ from the receivers R1, R2. The ECU 101 then modulates the frequency $f_{B1}$ of the first base signal $S_{B1}$ together with the frequencies $f_{R1}$, $f_{R2}$ of the reflected signals $S_{R1}$, $S_{R2}$ to determine a first and second particle velocity values $v_{p1}$, $v_{p2}$ which represent the speed of the particle (MOG particle M1 in this example) with respect to the receivers R1, R2. The particle velocity $v_p$ with respect to the receiver R1 or R2 can be calculated as follows:

$$v_p = \frac{(f_R - f_B)}{f_B} c$$

wherein $f_B$ is the frequency of the transmitted base signal, $f_R$ is the frequency of the reflected signal, and c is the speed of the ultrasonic wave. In one worked example for one receiver wherein $f_B$=40 kHz, $f_R$=41 kHz, and c=340 m/s, the particle velocity is 8.5 m/s.

Using triangulation principals and the particle velocity values associated with the two receivers R1, R2, the ECU may calculate a particle velocity tangent for the piece of MOG $M_1$ which includes direction information.

In operation many thousands of MOG and grain particles flow through the duct 50 and the reflected signals $S_{R1}$, $S_{R2}$ will be representative of a distribution of reflection events. As such, the ECU may serve to calculate a mean particle speed and tangent which is representative of all airborne particles that can be sensed.

Due to the nature of the airborne material (which will depend on harvested crop and current conditions) multiple groups of particles having similar properties may cause discrete groups of Doppler frequencies to be detected by the ECU 101. In one example the airborne grain G may travel with a different velocity to the airborne MOG M resulting in two discrete Doppler frequency 'spikes' being detected. In one embodiment the ECU 101 serves to resolve the multiple spikes and determine a grain velocity value $V_G$ and a MOG velocity value $V_M$. These values may serve as individual input parameters in the generation of control signals and may be weighted so that, for example, the MOG velocity value $V_M$ has a greater effect on a fan speed adjustment command than the grain velocity value $V_G$.

In summary of the Doppler mode, the sensing device 55 has a first ultrasonic transmitter T1 which is adapted to transmit the first base signal $S_{B1}$ with a frequency $f_{B1}$. The airborne grain G and MOG M within the duct 50 of the grain cleaning system 30 reflect portions of the first base signal $S_{B1}$ causing reflected signals $S_R$ having a frequency $f_R$, wherein the reflected signals are detected by spaced-apart receivers R1, R2. The ECU is configured to modulate the first base signal $S_{B1}$ and the reflected signals $S_{R1}$, $S_{R2}$ to obtain Doppler signals or frequencies from which an average particle velocity $v_p$ is determined. The particle velocity $v_p$ is used as an input parameter for the generation of control signals for the adjustment of various working units of the combine 10 including, by way of example, the fan and sieves.

Figure 8:
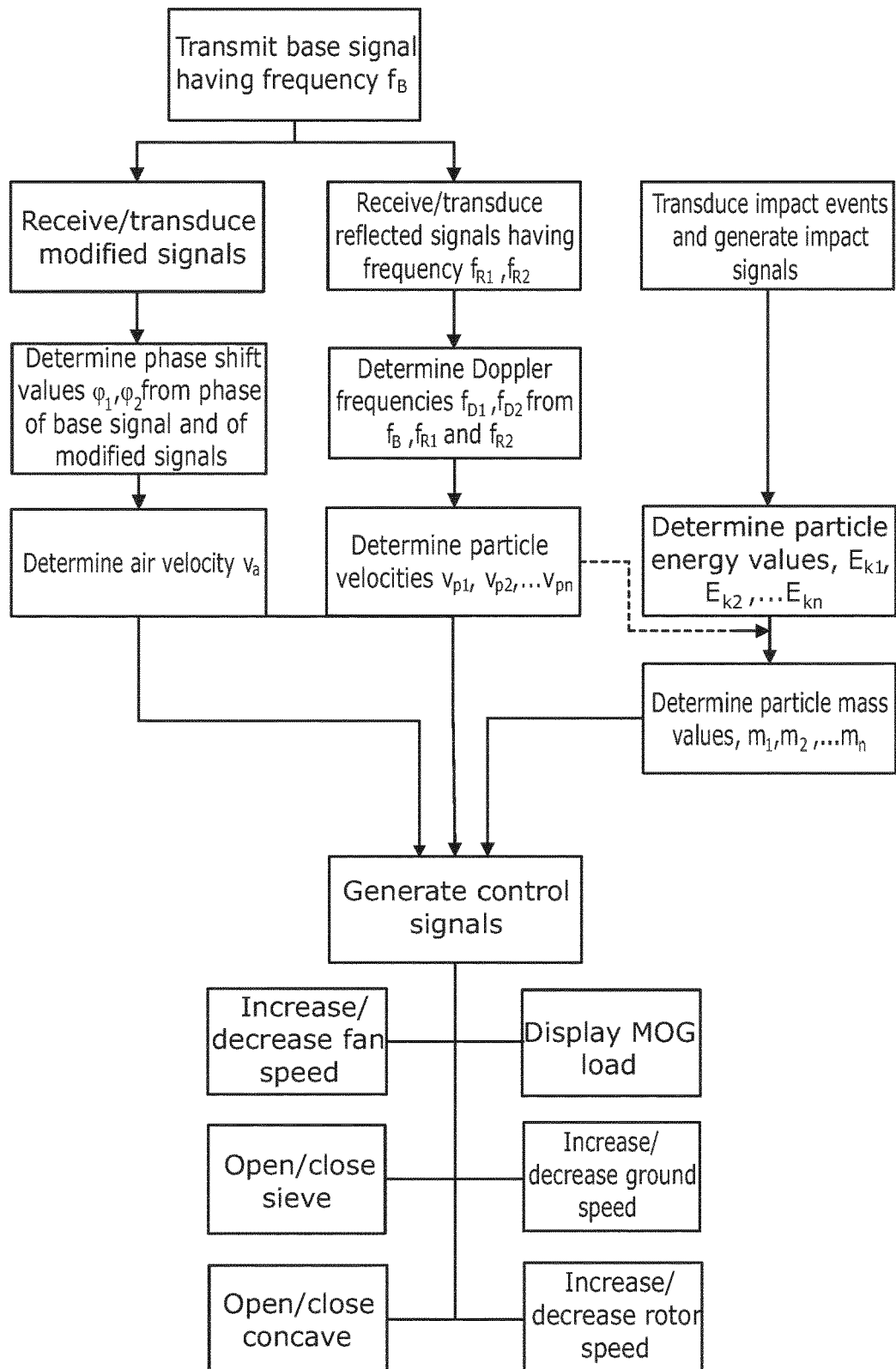
FIG. 8 is a flow diagram showing a method of controlling a combine harvester in accordance with a second embodiment of the invention.

One embodiment of the Doppler mode of operation is shown in the method of operating a combine represented by the process flow of FIG. 8.

Phase Shift Mode

Figure 7:
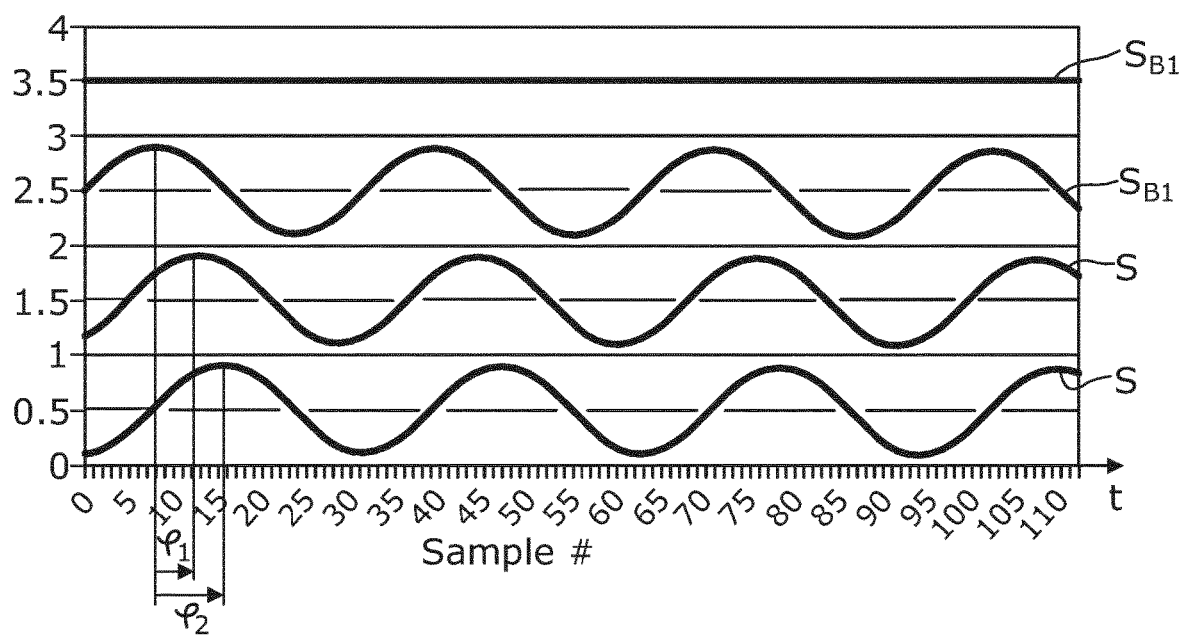
FIG. 7 is a plot of the base signals transmitted and the modified signals received by the shoe sensing system shown in FIGS. 3 and 4 in a phase shift mode.

With reference to FIG. 3, second transmitter T2 is operable to transmit a second base signal $S_{B2}$ in the form of an ultrasonic wave having a frequency $f_{B2}$ through the space above the screening apparatus 36 in a generally forward direction. The second base signal $S_{B2}$ is transmitted as a sine wave having a frequency of $f_{B2}$ which may to the order of 40 kHz for example. FIG. 7 shows a plot of second base signal $S_{B2}$.

In the phase shift mode of operation the first transmitter T1 is inactive or at least redundant. However, it should be appreciated the Doppler mode and the phase shift mode may operate concurrently in one embodiment, wherein the first transmitter T1 may be active during the phase shift mode.

The phase shift mode serves to measure the airstream velocity $v_a$ and use this measurement to generate a control signal for adjusting one or more of the working units. The propagation of ultrasonic waves through a medium is affected by movement of that medium. This signal modification is exploited by measuring the extent to which the second base signal $S_{B2}$ is phase shifted by movement of the cleaning airstream between two fixed points, the phase shift measurement then being used to determine the airstream velocity $v_a$. As with the Doppler mode explained above, taking multiple measurements at different angles and using triangulation principals allows a directional component of the airstream to be determined.

The second transmitter T2 is spaced rearwardly (or downstream) of the receivers R1, R2 on the module 55, and faces in a generally forward or upstream direction with respect to the cleaning airstream. In other words, the second transmitter T2 generally faces the receivers R1, R2. The second base signal $S_{B2}$ is transmitted by second transmitter T2 and is received and transduced by the first and second receivers R1, R2. The second base signal $S_{B2}$ is modified by phase-shifting as it passes through the cleaning airstream between the second transmitter T2 and the receivers R1, R2. The extent of phase-shift $\varphi$ is dependent upon the airstream velocity $v_a$.

Taken as a snapshot in time in one example FIG. 3 shows first receiver R1 receiving a first modified signal $S_{M1}$ which is a modified portion of transmitted base wave $S_{B2}$. At the same instant second receiver R2 receives a second modified signal $S_{M2}$ which is another modified portion of transmitted base wave $S_{B2}$. The modified signals $S_{M1}$, $S_{M2}$ have a phase shift value $\varphi_1$, $\varphi_2$ compared to second base wave $S_{B2}$ and are also plotted in FIG. 7.

The ECU 101 receives the transduced signals $S_{M1}$, $S_{M2}$ from the receivers R1, R2. The ECU 101 then determines the phase shift values $\varphi_1$, $\varphi_2$ with respect to the phase of the second base signal $S_{B2}$ to determine first and second airstream velocity values $v_{a1}$, $v_{a2}$ which represent the airstream velocity along the line of sight between the second transmitter T2 and the respective receivers R1, R2.

Figure 13:
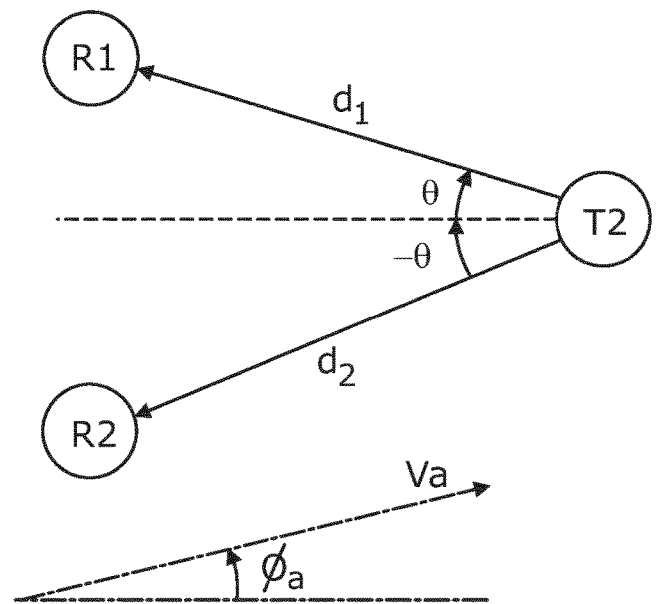
FIG. 13 is a schematic diagram showing the parameters involved with calculating an airstream velocity tangent using the apparatus of FIG. 3.

Using triangulation principals and the airstream velocity components $v_{a1}$, $v_{a2}$ with respect to the two receivers R1, R2, the ECU calculates an airstream velocity tangent $\phi$ which includes direction information. With reference to FIG. 13 the individual airstream velocity components are calculated as $$v_{a1} = \frac{d_1}{t_{d1}}$$

$$v_{a2} = \frac{d_2}{t_{d2}}$$

wherein d is the distance between the second transmitter T2 and receivers R1, R2, and t is the measured propagation delay from transmitter to receiver. Having obtained the individual airstream components $v_{a1}$, $v_{a2}$ the speed $v_a$ and direction $\phi$ of the airstream can be obtained solving to two equations $$v_{a1} = \cos(\theta - \phi_a) v_a$$

$$v_{a2} = \cos(-\theta - \phi_a) v_a.$$

The calculated airstream velocity values $v_a$ is utilised by the ECU as an input parameter for the generation of control signals that serve to command adjustments of the various working units 105, 122, 126, 134, 136 shown connected to the databus in FIG. 4. For example, in one embodiment the airstream velocity value $v_a$ is an input parameter for a fan speed control algorithm which is executed locally by the fan speed controller 134 or the ECU 101, wherein the control algorithm operates a negative feedback loop such that the speed of fan 34 is increased when the airstream velocity value $v_a$ falls below a fan speed set point.

One embodiment of the phase shift mode of operation is shown in the method of operating a combine represented by the process flow of FIG. 8.

The above-described embodiment of the phase shift mode shares the same pair of receivers R1, R2 as utilised for the Doppler mode but employs a second transmitter T2 to generate a second base signal $S_{B2}$. In an alternative embodiment shown in FIG. 11, a second pair of receivers R3, R4 are provided for implementation of the phase-shift mode. The third and fourth receivers R3, R4 are spaced downstream (rearwardly) of the sole transmitter T1 and face upstream so as to face the transmitter T1.

In the embodiment of FIG. 11, a base signal $S_{B1}$ transmitted by the transmitter T1 is modified by phase shifting by the movement of the cleaning airstream before detection by the receivers R3, R4. In a similar manner as described above, the ECU 101 receives transduced signals $S_{M1}$, $S_{M2}$ from the receivers R3, R4. The ECU 101 then modulates phase shift values $\varphi_1$, $\varphi_2$ with respect to the phase of the base signal $S_{B1}$ to determine first and second airstream velocity values $v_{a1}$, $v_{a2}$ which represent the airstream velocity along the line of sight between the first transmitter T1 and the respective receivers R3, R4.

Although first and second receivers R1, R2 are shown in FIG. 11, these are provided for implementation of the Doppler mode. It should be understood that the phase shift mode may be implemented independently of the Doppler mode and, as such, the first and second receivers R1, R2 may be omitted.

In summary of the phase shift mode, an ultrasonic sensing device has a transmitter T2 and at least one receiver R1, R2 spaced from the transmitter T2. The transmitter T2 transmits a base signal $S_{B2}$ towards the at least one receiver R1, R2, the base signal $S_{B2}$ being modified in the form of a phase shift $\varphi$ as it passes through a cleaning airstream in the duct 50 of the grain cleaning system 30. The receivers R1, R2 are configured to receive and transduce modified signals $S_{M1}$, $S_{M2}$ which are modified portions of the base signal $S_{B2}$. The ECU 101 generates control signals for adjustment of one or more working units, wherein the control signals are based upon a phase shift value $\varphi_1$, $\varphi_2$ associated with the modified signals $S_{M1}$, $S_{M2}$ with respect to the phase of the base signal $S_{B2}$.

Impact Detection Mode

In another mode of operation (which may operate concurrently or independently of the Doppler mode and phase shift mode described above) the impact sensor 54 is used to transduce impact events caused by the airborne particles striking the impact-sensing surface 54' and generate impact signals $Y_k$ therefrom. The ECU 101 is configured to then generate control signals based upon particle energy values $E_k$ that are determined from the impact signals $Y_k$.

The right-hand side of the process flow in FIG. 8 illustrates an embodiment of the impact detection mode.

Estimation of MOG Throughput $Q_M$

Determination of a particle velocity $v_p$ using the Doppler mode has been described above, wherein the MOG velocity $v_M$ may be determined separately from the grain velocity $v_G$. Determination of an airstream velocity $v_a$ using the phase shift mode has also been described above. Determination of particle energy values $E_k$ using the impact detection mode has been described above.

The above modes of operation may be used independently or in combination to determine physical parameters that are representative of the state of the grain cleaning system 30 at any one time including particle velocity $v_p$ (which may be resolved to MOG particle velocity $v_M$ and/or grain particle velocity $v_G$), airstream velocity $v_a$, and particle (kinetic) energy $E_k$. The physical relationships between these parameters are utilised by control algorithms for the working units that are executed locally or by the ECU 101, wherein a subset of the available parameters are provided as inputs to the algorithms.

Knowledge of MOG throughput (or load) $Q_M$ at a given time is advantageous in the automatic control or adjustment of some work units including the fan 34 and sieves 38, 39. In various embodiments a value representing MOG throughput $Q_M$ is determined by the ECU 101 by utilising one or more of the values determined from the Doppler mode, phase shift mode and impact detection mode. Some of these embodiments are described below.

In one embodiment the physical effect on airstream velocity $v_a$ and/or particle velocity $v_p$ caused by the MOG throughput $Q_M$ is exploited to determine a value for MOG throughput $Q_M$ (in tons per hour for example), based on the theoretical energy $E_k$ in each particle:

$$E_k = 1/2 m_p v_p^2$$

wherein $m_p$ is the particle mass.

Thus the dissipated power from MOG throughput $Q_M$ may be calculated by the ECU 101 following a polynomial:

$$Q_M = \frac{A}{v_M^2} + \frac{B}{v_a^2}$$

wherein A and B are constants, $v_M$ is the MOG particle velocity determined by the Doppler mode, $v_a$ is the airstream velocity determined by the phase shift mode.

In another embodiment the physical relationship between the particle impact energy $E_k$, the particle mass $m_p$, and the particle velocity $v_p$ is built into a control algorithm to determine the particle mass $m_p$ and hence the throughput Q. The impact energy values $E_k$ are proportional to the mass $m_p$ of the particles striking the impact sensor 54 which generates a sensor signal $Y_k$ which represents the dissipated power from $E_k$ over a given time period, and the square of the particle velocity $v_p$.

$$Y_k \propto m_p v_p^2$$

$$m_p \propto \frac{Y_k}{v_p^2}$$

The MOG throughput $Q_M$ is proportional to mass per unit time (kg/s or ton/hour). In one embodiment an estimation of the MOG throughput $Q_M$ is made by measuring the impact energy $E_k$ and the particle velocity $v_p$. The particle energy value $E_k$ is determined using the impact sensor 54.

Aspects of the invention have been described that exploit various physical characteristics of airborne particles carried in a cleaning airstream and the physical interaction of those particles with acoustic waves and sensors to indirectly determine physical properties of those particles. Those properties then serve as input parameters for control algorithms used to control adjustment of various working units in the grain cleaning system.

From reading the present disclosure, other modification will be apparent to persons skilled in the art. Such modifications may involve other features which are already known in the field of grain cleaning systems, component parts, and automatic setting systems therefore, and which may be used instead of or in addition to features already described herein.

The invention claimed is:

1. A grain cleaning system comprising:
   a screening apparatus having a duct;
   an upper sieve and a lower sieve disposed in the duct;
   a fan arranged to generate a cleaning airstream through the duct;
   an impact sensor mounted in the duct above the upper sieve and comprising an impact-sensing surface facing in an upstream direction with respect to the cleaning airstream, wherein the impact sensor is configured to transduce impact events and generate impact signals therefrom;
   an electronic control unit (ECU) that is in communication with the impact sensor, wherein the ECU is configured to generate control signals based upon a particle energy value determined from the impact signals; and
   an ultrasonic sensing device comprising:
      a transmitter configured to transmit a base signal through the cleaning airstream; and
      a receiver configured to transduce a reflected signal reflected off of airborne particles in the cleaning airstream,
   wherein the ECU is in communication with the ultrasonic sensing device, and
   wherein the ECU is configured to determine a Doppler frequency from a frequency of the base signal and a frequency of the reflected signal, and determine a velocity value for the airborne particles from the Doppler frequency.

2. The grain cleaning system of claim 1, wherein the control signals are based upon a value for the fan speed.

3. The grain cleaning system of claim 1, wherein the duct comprises a pair of sidewalls between which the upper sieve and lower sieve are located, and a ceiling, wherein the impact sensor is mounted closer to the ceiling than to the upper sieve.

4. The grain cleaning system of claim 1, wherein the upper sieve and lower sieve are coupled to an oscillating drive mechanism, wherein the fan is located at an upstream end of the sieves , and wherein the cleaning airstream is directed through and/or over the sieve.

5. The grain cleaning system of claim 1, wherein the ECU is further configured to determine a mass value of the airborne particles from the particle energy value and the particle velocity value.

6. The grain cleaning system of claim 5, further comprising an operator console which is in communication with the ECU, wherein the operator console displays a material load proportional to the particle mass value.

7. The grain cleaning system of claim 1, wherein the ECU is further configured to generate the velocity value for the airstream based upon a phase shift parameter calculated from signals received by the ultrasonic sensing device, and to generate control signals for one of the fan, an opening of the upper sieve, an opening of the lower sieve, and upstream processing systems based upon the airstream velocity value.

8. The grain cleaning system of claim 1, wherein the control signals control a speed of the fan.

9. The grain cleaning system of claim 1, wherein the control signals control an opening adjustment of the upper and the lower sieve.

10. A combine harvester comprising the grain cleaning system of claim 1.

11. The combine harvester of claim 10, further comprising a threshing apparatus and a separating apparatus located upstream of the grain cleaning system with respect to a flow of crop material.

12. A method of controlling a combine harvester which comprises a plurality of working units including a grain cleaning system with an upper sieve and a lower sieve, the method comprising:
   positioning an impact sensor above the upper sieve, wherein the impact sensor comprises an upstream-facing, impact-sensing surface;
   generating an impact signal;
   calculating a particle energy value from the impact signal; and
   determining a particle velocity value and calculating a particle mass value from the particle energy value and the particle velocity value.

13. The method of claim 12, further comprising generating control signals for one of a fan, a sieve opening and upstream processing systems, wherein the control signals are based upon the particle energy value.

14. The method of claim 13, wherein the control signals are also based upon a speed value of the fan.

15. The method of claim 12, further comprising displaying a material load representation based upon the particle mass value.

* * * * *